(12) United States Patent
Kittle (10) Patent No.: US 6,447,243 B1
(45) Date of Patent: Sep. 10, 2002

(54) BUOYANCY PRIME MOVER

(76) Inventor: Ira F. Kittle, 737 Trafalgar St., Deltona, FL (US) 32725

( * ) Notice: Subject to any disclaimer, the term of this patent is extended or adjusted under 35 U.S.C. 154(b) by 0 days.

(21) Appl. No.: 09/692,384

(22) Filed: Oct. 20, 2000

(51) Int. Cl.⁷ .................................................. F01D 1/00
(52) U.S. Cl. ........................................................ 415/92
(58) Field of Search ........................ 415/52.1, 60, 66, 415/67, 80, 202; 290/53; 60/495

(56) References Cited

U.S. PATENT DOCUMENTS

| | | | | |
|---|---|---|---|---|
| 271,040 A | * | 1/1883 | Cook | 60/496 |
| 272,656 A | * | 2/1883 | Cook | 60/496 |
| 4,363,212 A | | 12/1982 | Everett | |
| 4,981,015 A | | 1/1991 | Simpson | |
| 5,753,978 A | | 5/1998 | Lee | |
| 5,899,066 A | | 5/1999 | Brassea-Flores | |

* cited by examiner

Primary Examiner—Edward K. Look
Assistant Examiner—Dwayne J White (57) ABSTRACT

A buoyancy prime mover having a wheel rotating within a housing. An upper portion of the housing communicates with a lower portion of the housing through pipes and a blower. The blower pumps high pressure operating gas through a blower pipe into a lower portion of the housing. The housing contains operating liquid having a lower buoyancy than the operating gas. The wheel has a plurality of circumferentially disposed buckets. In operation, the blower pumps operating gas into the lower housing portion, where it bubbles up into the buckets. The greater buoyancy of the operating gas causes the wheel to turn. A venturi pipe connects a gas return pipe to to a venturi disposed within the lower housing portion. A venturi low pressure area pulls operating gas through the venturi pipe into the buckets, which also causes the wheel to rotate. At steady state operation, approximately half the operating gas in the buckets comes from the blower, and about half is pulled in through the venturi. The blower reduces the operating gas pressure in the gas return pipe and increases the operating gas pressure flowing into the housing. The operating gas in that portion of the wheel which is travelling upwards reduces the weight acting on that portion of the wheel and therefore creates a down pressure on that portion of the wheel which is travelling downwards, thus increasing speed and torque. The operating liquid weight in the buckets and the speed of the rotating liquid develop the main rotating power.

19 Claims, 6 Drawing Sheets

BUOYANCY PRIME MOVER

BACKGROUND OF THE INVENTION

FIELD OF THE INVENTION

This invention relates to prime movers, and in particular to a buoyancy prime mover.

BACKGROUND OF THE INVENTION

Fluids in the form of water or air have long figured in the conversion of energy. Water has long been used in water wheels to produce rotary motion. One example of water power is the grinding mill where wheat or corn was ground using energy produced by a water wheel placed under a waterfall. Another water power example is the modern hydroelectric plant where a turbine is turned by water escaping a dam, and the turbine in turn drives an electric generator.

Air power has been harnessed in the form of windmills, which may drive apparatuses as diverse as grinding mills, irrigation pumps, and electrical generators. Traditionally, windmills comprise rotating vanes attached to a base. The base swivels so that the vanes are disposed as orthogonal as possible relative to the wind, so that the effect of the wind will be maximized.

These traditional methods of power generation suffered from a number of disadvantages. Hydroelectric plants could only be located where a suitable waterfall was located, or where a river could be dammed to produce the necessary hydraulic head. Even where a river existed and the proper topographical features were present to provide reservoir containment once a dam was built, the environmental impact could have negative consequences. For example, the Colorado River in North America has been so extensively exploited that a mere trickle is all that survives to reach the Gulf of California. Consequently, during the last two hundred years the bulk of the delta ecosystem that once existed at the mouth of the Colorado River has been obliterated. Thus, the ecological downside of hydroelectric power generation can be considerable.

Windmills only work when there is wind present. During days in which the wind is calm, these devices simply do not work.

Existing Designs

A number of generators have been proposed to avoid the problems of hydroelectric plants and windmills. Brassea-Flores was granted U.S. Pat. No. 5,899,066 for a Buoyancy and Thermal Differentials Energy Generator, which used temperature differentials present in stratified ocean layers and/or night/day differentials in deserts. Although the Brassea-Flores device claimed to be able to operate using narrow temperature differentials, it was complex and therefore expensive.

Buoyancy-type generators have been proposed by a number of inventors. U.S. Pat. No. 5,753,978 was granted to Lee for a Floater Energy Generator. This device used floaters reminiscent of Ping-Pong balls. While the Lee device provided for power to be produced using the buoyancy of air trapped inside the floaters, the device was complex, partly due to the problem of introducing floaters into the bottom of a tank of water without allowing the water in the tank to leak out.

U.S. Pat. Nos. 4,363,212 and 4,981,015 were granted Everett and Simpson respectively for buoyancy prime movers. Although these devices taught translation of buoyant forces into rotary motion, their source of gas was not disclosed. In addition, the gas used was not recycled, but rather was allowed to escape into the atmosphere.

SUMMARY OF THE INVENTION

Accordingly, it is an object of the present invention to provide a buoyancy prime mover which does not require an unlimited supply of operating liquid nor operating gas. Design features allowing this object to be accomplished include a gas return pipe and a blower connecting a housing upper portion and a housing lower portion. An advantage associated with the accomplishment of this object is flexibility of location of installation.

It is another object of the present invention to provide a buoyancy prime mover which uses its own wheel motion to pull operating gas into wheel buckets. Design features allowing this object to be accomplished include a venturi pipe connecting a gas return pipe with a venturi disposed in a lower portion of a housing. A benefit associated with the accomplishment of this object is increased operating efficiency.

It is yet another object of this invention to provide a buoyancy prime mover which is inexpensive and easy to construct. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Six sheets of drawings are provided. Sheet one contains FIG. 1. Sheet two contains FIG. 2. Sheet three contains FIG. 3. Sheet four contains FIG. 4. Sheet five contains FIG. 5. Sheet six contains FIG. 6.

DETAILED DESCRIPTION OF THE PREFERRED EMBODIMENT

Figure 1:
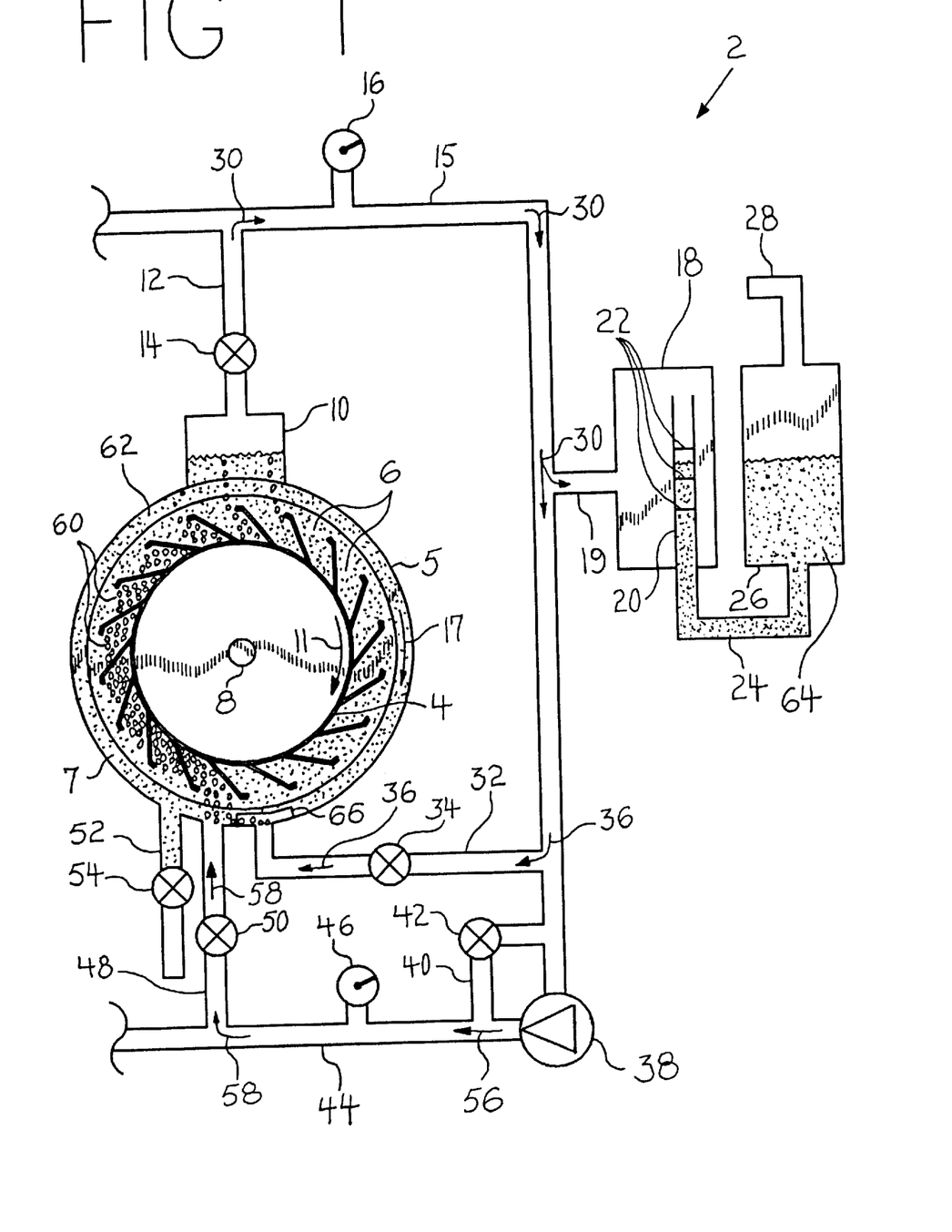
FIG. 1 is a side cross-sectional view of a buoyancy prime mover.
Figure 2:
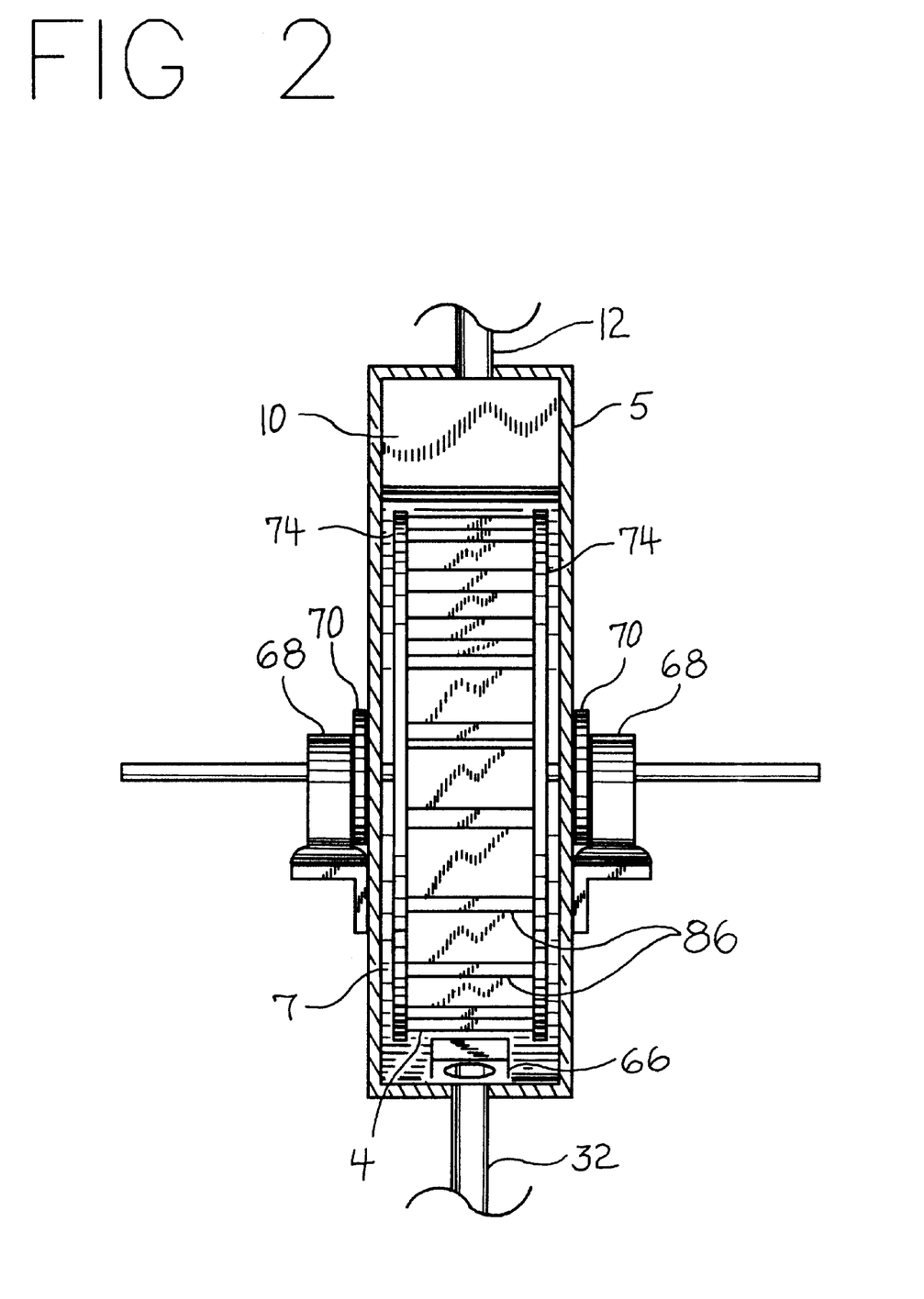
FIG. 2 is a front cross-sectional view of a wheel within a housing.
Figure 4:
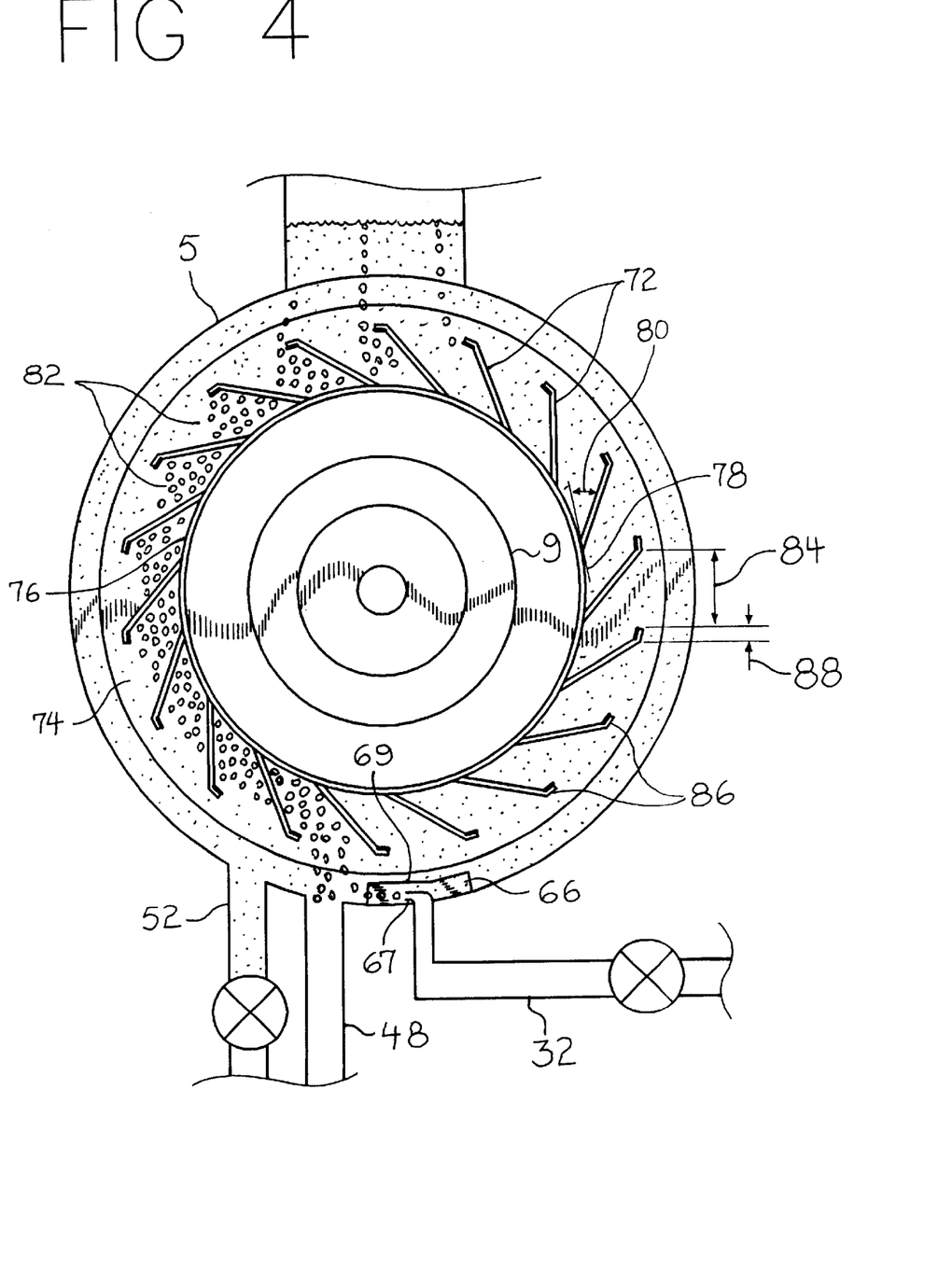
FIG. 4 is a side cross-sectional view of a wheel within a housing.

FIG. 1 is a side cross-sectional view of buoyancy prime mover 2. Buoyancy prime mover 2 comprises wheel 4 turning on axle 8 within housing 5. FIG. 2 is a front cross-sectional view of wheel 4 within housing 5, and FIG. 4 is a side cross-sectional view of wheel 4 within housing 5. Housing 5 comprises wheel chamber 7 communicating with gas/liquid separation chamber 10. Wheel 4 comprises a pair of wheel sides 74 separated by bucket floor 76 and a plurality of bucket walls 72. Wheel sides 74, bucket floor and 76 bucket walls 72 define buckets 6.

Housing wheel chamber 7 is filled with operating liquid 62, within which wheel 4 turns as urged by operating gas 60 from blower gas ingress pipe 48 and venturi pipe 32. As may be observed in FIG. 4, wheel 4 may comprise a wheel buoyancy tank 9 which renders wheel 4 neutral in buoyancy when floating in operating liquid 62.

Buckets 6 comprise bucket openings 82, defined by wheel sides 74, bucket walls 72, and bucket wall lips 86. In the preferred embodiment, bucket wall lip width 88 was 25%±10% of bucket opening width 84. Bucket floor tangent line 78 is a line tangent to bucket floor 76 at a point at which bucket wall 72 attaches to bucket floor 76. Bucket wall angle 80 is the angle between bucket floor tangent line 78 and bucket wall 72. In the preferred embodiment, bucket wall angle 80 was 32°±10°.

Gas/liquid separation chamber 10 communicates with housing wheel chamber 7, and is disposed at an upper edge of housing 5. Gas outflow pipe 12 communicates with gas/liquid separation chamber 10 at one extreme and gas return pipe 15 at an opposite extreme. Gas outflow pipe valve 14 is disposed on gas outflow pipe 12. Gas return pipe 15 communicates with blower pipe 44 through blower 38 and blower bypass pipe 40 having blower bypass pipe valve 42. In turn, blower pipe 44 communicates with a lower portion of housing wheel chamber 7 by means of blower gas ingress pipe 48 having blower gas ingress pipe valve 50.

Gas return pipe 15 additionally communicates with housing wheel chamber 7 through venturi pipe 32 having venturi pipe valve 34, venturi operating gas intake 67 and venturi 66. Housing wheel chamber 7 communicates with an exterior of housing 5 by means of drain pipe 52 having drain pipe valve 54. Gas return pipe pressure gage 16 is disposed on gas return pipe 15, and blower pipe pressure gage 46 is disposed on blower pipe 44.

Accumulator 18 communicates with gas return pipe 15 through accumulator pipe 19. Surge tank 26 communicates with accumulator 18 though accumulator pipette pipe 24 and accumulator pipette 20. Accumulator pipette 20 is disposed within accumulator 18, and bears accumulator pipette indicia 22. Accumulator pipette indicia 22 indicates operating gas 60 pressure. An interior of surge tank 26 communicates with in exterior of surge tank 26 through surge tank vent 28. Surge tank liquid 64 is disposed within surge tank 26, accumulator pipette pipe 24 and accumulator pipette 20.

Wheel 4 turns on axle 8. Axle 8 is supported by bearings 68. Seals 70 hermetically seal axle 8's exits from housing 5.

Figure 5:
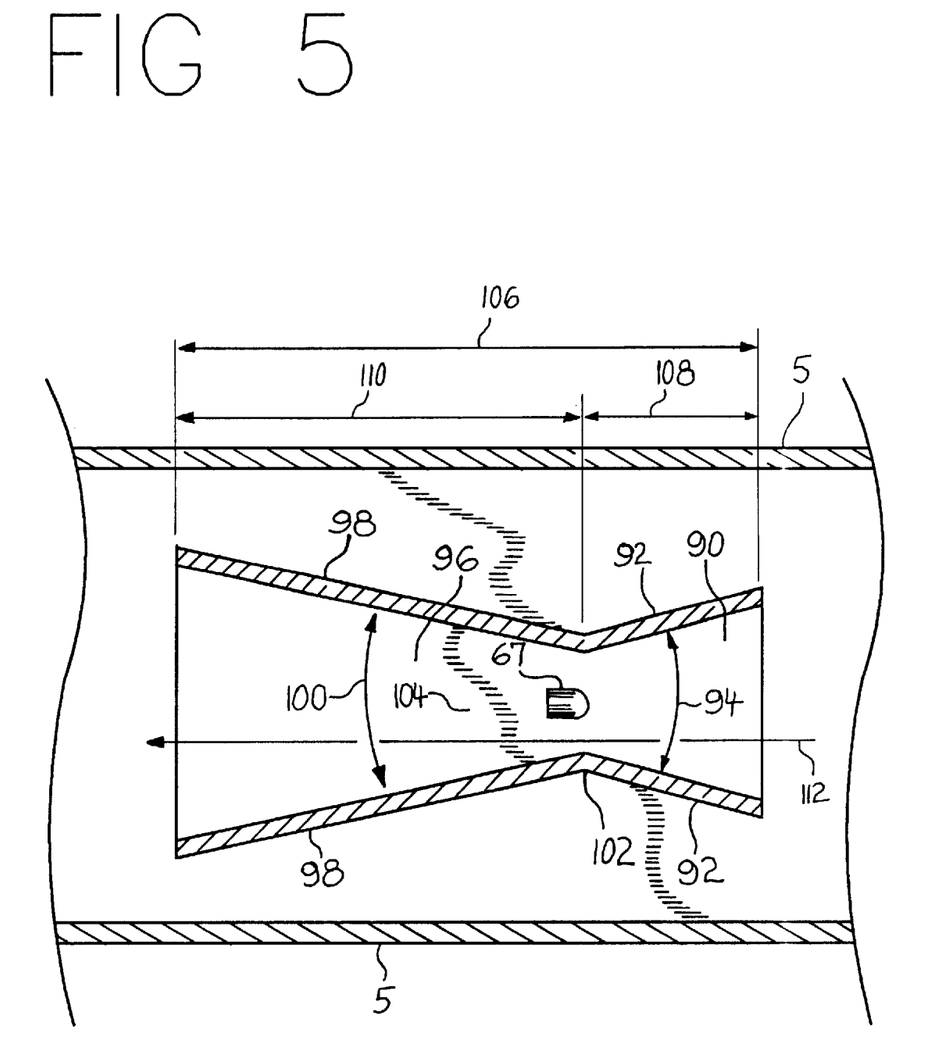
FIG. 5 is a top cross-sectional view of a venturi.

Venturi 66 is more clearly depicted in FIG. 5, a top cross-sectional view of venturi 66, and FIG. 4. Operating liquid 62 flows through venturi 66 as indicated by arrow 112 in FIG. 5. The reason for this flow of operating liquid 62 is illustrated in FIG. 1. Due to the viscosity of operating liquid 62, when wheel 4 rotates as indicated by arrow 11, operating liquid 62 in housing wheel chamber 7 tends to circulate as indicated by arrow 17, which circulation causes operating liquid 62 to flow through venturi 66 as indicated by arrow 112.

The shape of venturi 66 creates venturi low pressure area 104 downstream of venturi throat 102. Venturi low pressure area 104 tends to suck operating gas 60 into housing wheel chamber 7 through venturi operating gas intake 67.

Venturi 66 having venturi length 106 comprises venturi intake funnel 90 communicating with venturi outflow nozzle 96 through venturi throat 102. Venturi intake funnel 90 has venturi intake funnel length 108 and venturi outflow nozzle 96 has venturi outflow nozzle length 110. In the preferred embodiment, venturi intake funnel length 108 was 30%±10% of venturi length 106, and venturi outflow nozzle length 110 was 70%±10% of venturi length 106. Venturi operating gas intake 67 was disposed just downstream of venturi throat 102.

Venturi intake funnel 90 is defined by housing 5, venturi intake funnel walls 92 and venturi roof 69. Venturi intake funnel walls 92 are disposed at a venturi intake funnel wall angle 94 of 30°±10° relative to each other.

Venturi outflow nozzle 96 is defined by housing 5, venturi outflow nozzle walls 98 and venturi roof 69. Venturi outflow nozzle walls 98 are disposed at a venturi outflow nozzle wall angle 100 of 24°±10° relative to each other. As may be observed in FIG. 4, the outlet of venturi outflow nozzle 96 is disposed at the bottom-most point of housing wheel chamber 7.

In operation, buoyancy prime mover 2 provides rotational output through axle 8 because operating gas 60 which has greater buoyancy than operating liquid 62 is supplied to buckets 6 through blower gas ingress pipe 48 and venturi operating gas intake 67. Operating gas 60 fills buckets 6 at the bottom of housing wheel chamber 7, and its greater buoyancy urges wheel 4 to rotate. At the top of housing wheel chamber 7 the operating gas 60 in buckets 6 escapes into gas/liquid separation chamber 10, ready for re-use.

When wheel 4 is at rest, drain pipe valve 54, blower gas ingress pipe valve 50, and venturi pipe valve 34 are closed to prevent operating liquid 62 from escaping housing 5. The energy conversion process commences by starting blower 38, which urges operating gas 60 into the bottom of housing wheel chamber 7 through blower gas ingress pipe 48. At this initial point, blower gas ingress pipe valve is opened, and drain pipe valve 54 and venturi pipe valve 34 remain closed.

Operating gas 60 is pumped by blower 38 through blower pipe 44 and blower gas ingress pipe 48 into buckets 6 disposed at the bottom of housing wheel chamber 7 as indicated by arrows 56 and 58, respectively. Because operating gas 60 has greater buoyancy than operating liquid 62, wheel 4 turns as indicated by arrow 11. As operating gas 60 rises with buckets 6, it expands due to lower operating fluid 62 pressure closer to the surface. As buckets 6 containing operating gas 60 ascend, bucket wall lips 86 help retain operating gas 60 within buckets 6. As each bucket 6 passes its highest point, its operating liquid 60 is disgorged into gas/liquid separation chamber 10, where operating gas 60 bubbles to the surface of operating liquid 62.

The higher operating gas 60 pressure in gas/liquid separation chamber 10 pushes operating gas 60 through gas return pipe 15 to blower 38 as indicated by arrows 30, and thence back to the bottom of housing wheel chamber 7 as indicated by arrows 56 and 58. The action of blower 38 reduces high pressure in gas return pipe 15 and increases the low pressure in blower pipe 44, thus reducing the high pressure in gas return pipe 15, and also reduces pressure needed for operating gas 60 to ingress into housing 5.

Once buoyancy prime mover 2 operation has commenced, venturi pipe valve 34 is opened. The higher operating gas 60 pressure in gas/liquid separation chamber 10 also pushes operating gas 60 through gas return pipe 15 into venturi pipe 32 as indicated by arrows 36, and venturi low pressure area 104 pulls operating gas 60 through venturi operating gas intake 67 into buckets 6. During steady state operation, approximately 50% of the operating gas 60 in housing wheel chamber 7 is supplied through venturi pipe 32 and venturi operating gas intake 67, and approximately 50% of the operating gas 60 in housing wheel chamber 7 is supplied through blower gas ingress pipe 48.

If desired, blower bypass pipe valve 42 may be opened to adjust the flow of operating gas 60 which passes through blower 38 as opposed to through blower bypass pipe 40.

To shut down operation, drain pipe valve 54, blower gas ingress pipe valve 50, and venturi pipe valve 34 are closed to prevent operating liquid 62 from escaping housing 5, and then blower 38 is tuned off. The interruption of the flow of operating gas 60 causes wheel 4 to cease turning, and buoyancy prime mover 2 is ready for re-starting at a later time.

Figure 3:
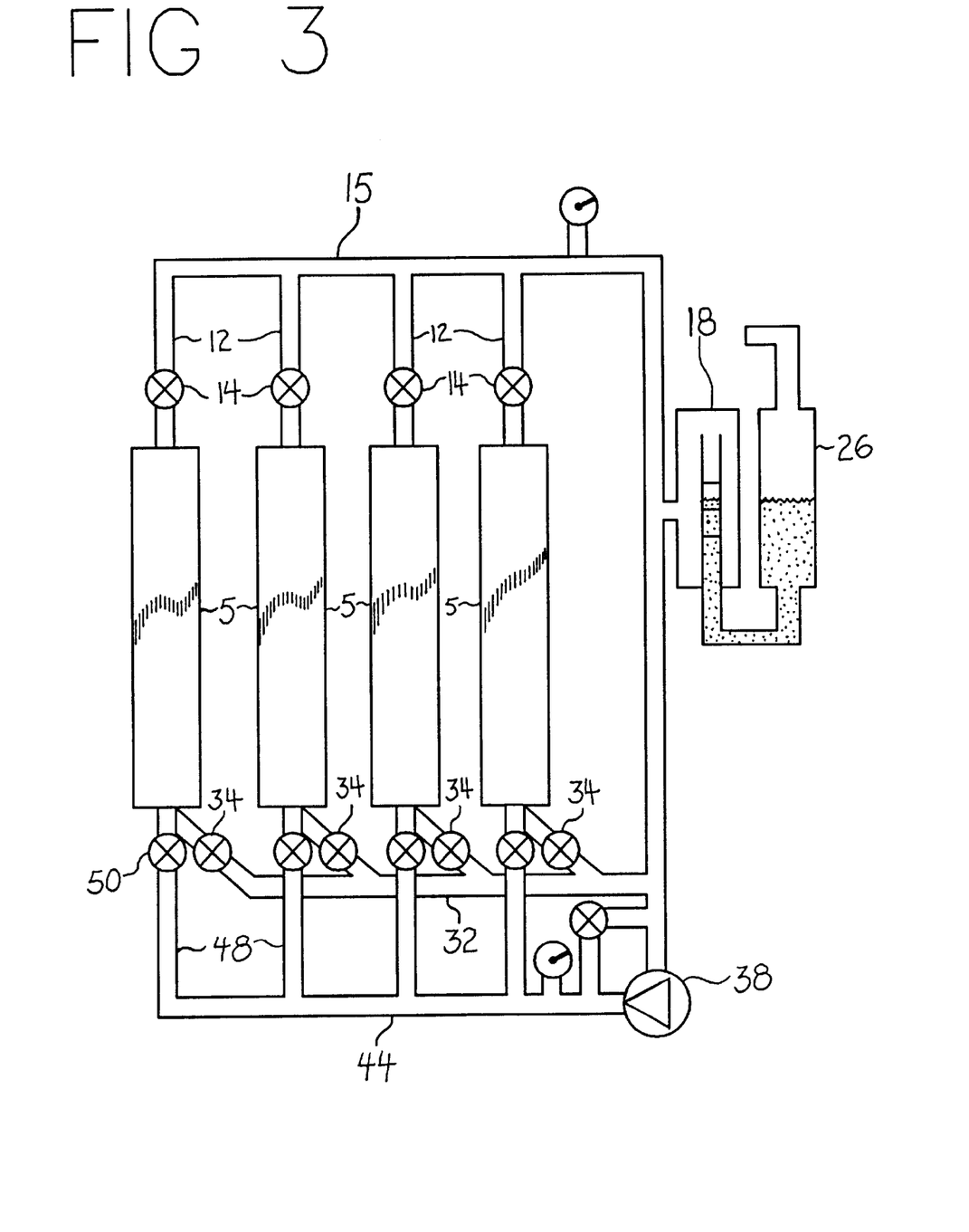
FIG. 3 is a side schematic view of an array of four buoyancy prime movers in parallel.

FIG. 3 is a side schematic depiction of an array of four buoyancy prime movers 2 connected in parallel. Any number of buoyancy prime movers 2 may be connected in array as depicted in FIG. 3 in order to produce greater output. Only one accumulator 18 and surge tank 26 may be needed for the array.

Figure 6:
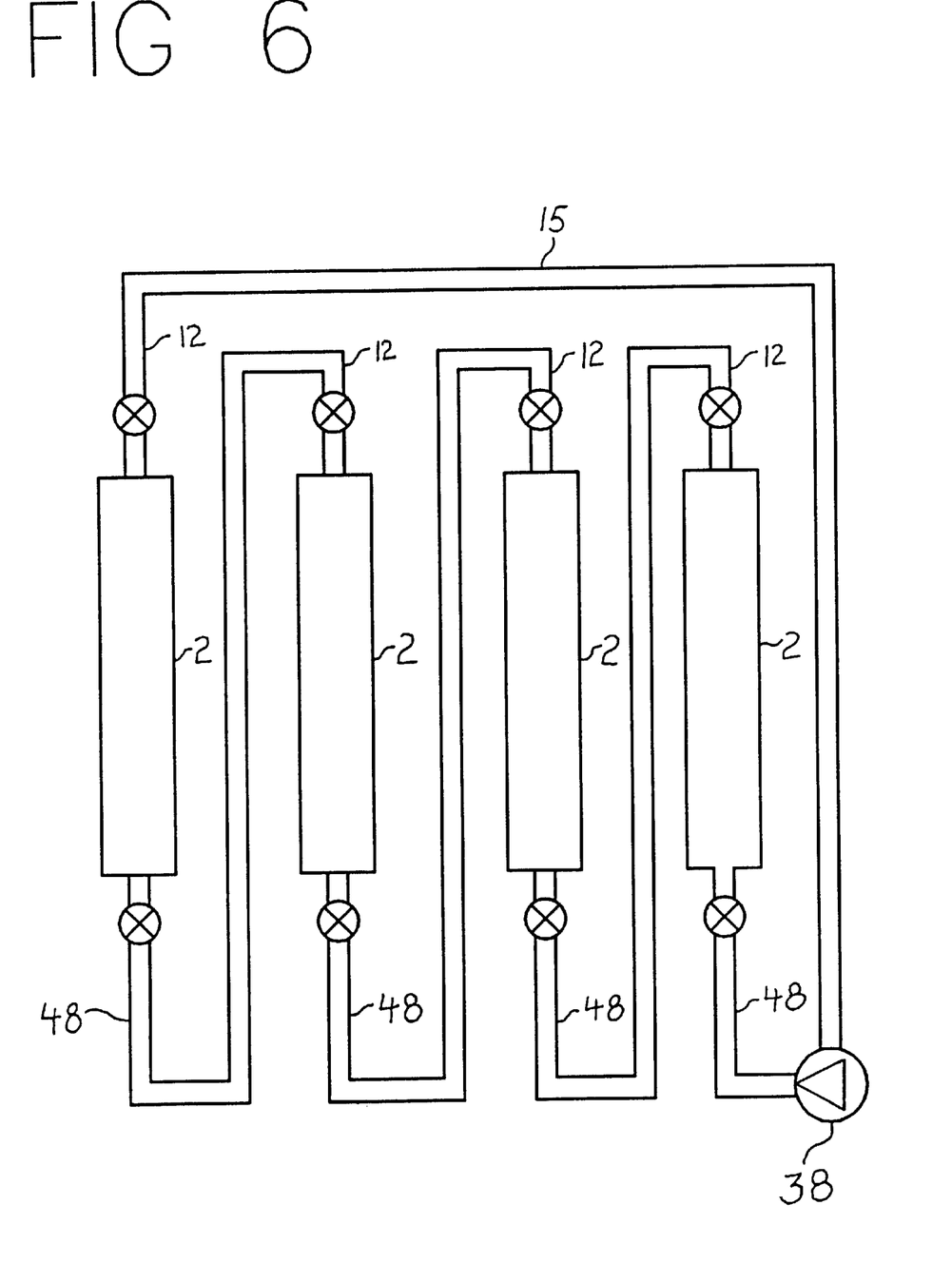
FIG. 6 is a side schematic view of an array of four buoyancy prime movers in series.

FIG. 6 is a side schematic depiction of an array of four buoyancy prime movers 2 connected in series. Any number of buoyancy prime movers 2 may be connected in series array as depicted in FIG. 6 in order to produce greater output. Only one accumulator 18 and surge tank 26 may be needed for the array. In the series buoyancy prime mover 2 array depicted in FIG. 6, the gas outflow pipe 12 of each buoyancy prime mover 2 communicates with the blower gas ingress pipe 48 of an adjacent buoyancy prime mover 2, except that the gas outflow pipe 12 of a last buoyancy prime mover 2 communicates with blower 38 by mean of gas return pipe 15.

In the preferred embodiment, operating gas 60 was air or other appropriate gas, and operating liquid 62 and surge tank liquid 64 were water, alcohol or other appropriate liquid. It is contemplated to be within the scope of the instant invention that appropriate additives to prevent fungal and bacterial growth, as well as to avoid fluid freezing and/or boiling, be used in conjunction with operating gas 60 and/or operating fluid 62.

While a preferred embodiment of the invention has been illustrated herein, it is to be understood that changes and variations may be made by those skilled in the art without departing from the spirit of the appending claims.

DRAWING ITEM INDEX 2 buoyancy prime mover
4 wheel
5 housing
6 bucket
7 housing wheel chamber
8 axle
9 wheel buoyancy tank
10 gas/liquid separation chamber
11 arrow
12 gas outflow pipe
14 gas outflow pipe valve
15 gas return pipe
16 gas return pipe pressure gage
17 arrow
18 accumulator
19 accumulator pipe
20 accumulator pipette
22 accumulator pipette indicia
24 accumulator pipette pipe
26 surge tank
28 surge tank vent
30 arrow
32 venturi pipe
34 venturi pipe valve
36 arrow
38 blower
40 blower bypass pipe
42 blower bypass pipe valve
44 blower pipe
46 blower pipe pressure gage
48 blower gas ingress pipe
50 blower gas ingress pipe valve
52 drain pipe
54 drain pipe valve
56 arrow
58 arrow
60 operating gas
62 operating liquid
64 surge tank liquid
66 venturi
67 venturi operating gas intake
68 bearing
69 venturi roof
70 seal
72 bucket wall
74 wheel side
76 bucket floor
78 bucket floor tangent line
80 bucket wall angle
82 bucket opening
84 bucket opening width
86 bucket wall lip
88 bucket wall lip width
90 venturi intake funnel
92 venturi intake funnel wall
94 venturi intake funnel wall angle
96 venturi outflow nozzle
98 venturi outflow nozzle wall
100 venturi outflow nozzle wall angle
102 venturi throat
104 venturi low pressure area
106 venturi length
108 venturi intake funnel length
110 venturi outflow nozzle length
112 arrow

I claim:

1. A buoyancy prime mover comprising a wheel and a housing, said housing comprising a housing wheel chamber containing operating liquid, said wheel rotatably constrained within said house wheel chamber, an upper portion of said house communicating with a lower portion of said housing by means of a gas return pipe and a blower, said wheel comprising a plurality of buckets around its perimeter, whereby operating gas pumped by said blower enters said lower portion of said housing and becomes entrapped in some of said buckets, and a greater buoyancy of said operating gas compared to a buoyancy of said operating liquid causes said wheel to turn and a venturi disposed in said lower portion of said housing, a venturi operating gas intake disposed within said venturi, and a venturi pipe connecting said gas return pipe to said venturi operating gas intake, whereby operating gas is pulled into said housing lower portion by means of a venturi low pressure area disposed within said venturi.

2. The buoyancy prime mover of claim 1 further comprising an accumulator communicating with said gas return pipe through an accumulator pipe.

3. The buoyancy prime mover of claim 2 further comprising a surge tank communicating with said accumulator through an accumulator pipette pipe and an accumulator pipette, said surge tank communicating with an exterior of said surge tank through a surge tank vent, surge tank liquid disposed within said surge tank, said accumulator pipette pipe and said accumulator pipette, and accumulator pipette indicia associated with said accumulator pipette whereby operating gas pressure may be ascertained.

4. The buoyancy prime mover of claim 1 wherein said wheel comprises a pair of wheel sides, each said bucket being defined by said wheel sides, a wheel floor, and bucket walls, each said bucket wall being disposed at a bucket wall angle of 32°±10° relative to a line tangent to said bucket floor at an intersection of said bucket wall and said bucket floor.

5. The buoyancy prime mover of claim 4 wherein each said bucket wall further comprises a bucket wall lip attached to an extreme of said bucket wall opposite said bucket floor.

6. The buoyancy prime mover of claim 5 wherein each said bucket comprises a bucket opening defined by said pair of wheel walls, a bucket wall, and a bucket lip, a width of said bucket lip measuring 25%±10% of a width of said bucket opening.

7. The buoyancy prime mover of claim 1 wherein said venturi comprises a venturi intake funnel communicating with a venturi outflow nozzle through a venturi throat, a flow of said operating liquid proceeding through said venturi intake funnel, through said venturi throat, and thence through said venturi outflow nozzle, said venture low pressure area being disposed within said venturi outflow nozzle, said venturi operating gas intake being disposed within said venturi outflow nozzle adjacent said venturi throat.

8. The buoyancy prime mover of claim 7 wherein an operating liquid exit of said venturi outflow nozzle is located at a bottom-most point of said housing wheel chamber.

9. The buoyancy prime mover of claim 8 wherein a length of said venturi intake funnel is 30%±10% of a length of said venturi, and wherein a length of said venturi outflow nozzle is 70%±10% of a length of said venturi.

10. The buoyancy prime mover of claim 9 wherein said venturi intake funnel is defined by said housing wheel chamber, a pair of venturi intake funnel walls, and a venturi roof, said pair of venturi intake funnel walls being disposed at a venturi intake funnel wall angle of 30°±10° relative to each other.

11. The buoyancy prime mover of claim 10 wherein said venturi outflow nozzle is defined by said housing wheel chamber, a pair of venturi outflow nozzle walls, and a venturi roof, said pair of venturi outflow nozzle walls being disposed at a venturi outflow nozzle wall angle of 24°±10° relative to each other.

12. The buoyancy prime mover of claim 1 wherein said housing comprises a gas/liquid separation chamber disposed in said housing upper portion, said gas/liquid separation chamber communicating with said housing lower portion through a gas outflow pipe, then through said gas return pipe, then through said blower, then through a blower pipe, and then through a blower gas ingress pipe.

13. The buoyancy prime mover of claim 12 further comprising a valved blower bypass pipe connecting said gas return pipe to said blower pipe.

14. The buoyancy prime mover of claim 12 further comprising a gas outflow pipe valve in said gas outflow pipe, a venturi pipe valve in said venturi pipe, and a blower gas ingress pipe valve in said blower gas ingress pipe.

15. The buoyancy prime mover of claim of claim 12 further comprising a gas return pipe pressure gage on said gas return line, and a blower pipe pressure gage on said blower pipe.

16. The buoyancy prime mover of claim 15 further comprising a valved drain pipe communicating with said lower housing portion.

17. The buoyancy prime mover of claim 13 further comprising at least one additional buoyancy prime mover, each said at least one additional buoyancy prime mover comprising no blower, gas return pipes and blower pipes of said at least one buoyancy prime mover communicating with corresponding said gas return pipe and said blower pipe respectively of said buoyancy prime mover.

18. The buoyancy prime mover of claim 1 wherein said wheel turns on an axle and comprises a wheel buoyancy tank, whereby a buoyancy of said wheel is rendered neutral when said wheel is disposed within said operating liquid.

19. An array of buoyancy prime movers connected in series, said series array comprising a plurality of buoyancy prime movers, each said buoyancy prime mover comprising a wheel and a housing, each said housing comprising a housing wheel chamber containing operating liquid, said wheel being rotatably constrained within said housing wheel chamber, a gas/liquid separation chamber being disposed at an upper portion of said housing, a gas outflow pipe communicating with said gas/liquid separation chamber, a blower gas ingress pipe communicating with a lower portion of said housing, a venturi disposed in said lower portion of said housing, a venturi operating gas intake disposed within said venturi, and a venturi pipe connecting said gas return pipe to said venturi operating gas intake, whereby operating gas is pulled into said housing lower portion by means of a venturi low pressure area disposed within said venturi, said wheel comprising a plurality of buckets around its perimeter, whereby operating gas entering said housing via said blower gas ingress pipe enters said lower portion of said housing and becomes entrapped in some of said buckets, and a greater buoyancy of said operating gas compared to a buoyancy of said operating liquid causes said wheel to turn, a first said buoyancy prime mover blower gas ingress pipe communicating with a blower, said gas outflow pipe of each said buoyancy prime mover communicating with said blower gas ingress pipe of an adjacent buoyancy prime mover except said gas outflow pipe of a last buoyancy prime mover communicates with said blower by means of a gas return pipe.

\* \* \* \* \*